United States Patent
Schelin

Patent Number: 5,976,368
Date of Patent: Nov. 2, 1999

[54] DEVICE FOR THE SEPARATION OF OIL FROM WATER

[75] Inventor: Andreas Schelin, Kalmar, Sweden

[73] Assignee: Zickert Products A.B., Fjaras, Sweden

[21] Appl. No.: 08/860,235

[22] PCT Filed: Jul. 4, 1996

[86] PCT No.: PCT/SE96/00909

§ 371 Date: Jun. 3, 1997

§ 102(e) Date: Jun. 3, 1997

[87] PCT Pub. No.: WO97/02080

PCT Pub. Date: Jan. 23, 1997

[30] Foreign Application Priority Data

Jul. 6, 1995 [SE] Sweden ................................. 9502459

[51] Int. Cl.⁶ ........................ C02F 1/24; B01D 17/035; B01D 1/24
[52] U.S. Cl. ...................... 210/221.2; 210/703; 210/708
[58] Field of Search ........................... 210/221.2, 221.1, 210/86, 109, 703, 708

[56] References Cited

U.S. PATENT DOCUMENTS

| | | |
|---|---|---|
| 2,142,207 | 1/1939 | Price . |
| 3,479,281 | 11/1969 | Kinkindai . |
| 3,623,608 | 11/1971 | Waterman . |
| 3,986,954 | 10/1976 | George . |
| 4,464,343 | 8/1984 | Hitchcock . |
| 4,564,457 | 1/1986 | Cairo, Jr. et al. . |
| 4,746,440 | 5/1988 | Seeger . |
| 5,158,678 | 10/1992 | Broussard, Sr. . |
| 5,543,043 | 8/1996 | Bates . |

FOREIGN PATENT DOCUMENTS

| | | |
|---|---|---|
| 30389 | 6/1991 | Australia . |
| 0140310 | 5/1985 | European Pat. Off. . |
| 0211982 | 3/1987 | European Pat. Off. . |
| 2587913 | 4/1987 | France . |
| 570558 | 8/1977 | U.S.S.R. . |
| 955321 | 5/1964 | United Kingdom . |
| 1478555 | 7/1977 | United Kingdom . |
| 95/21134 | 8/1995 | WIPO . |

Primary Examiner—Thomas M. Lithgow
Attorney, Agent, or Firm—Horst M. Kasper

[57] ABSTRACT

This invention relates to a device for the separation of oil from water containing impurities in industries, waste plants, ships or the like. The device according to the invention is characterized in that it consists of an oil separation device (I), which is tapering upwards and provided with an inlet (1) and an outlet (2) and which in its lower part is arranged with partly airing means in the form of perforated pipes, cloth or membrane as an air outlet (4) and an air inlet (5) partly an outlet (9) for the drawing of water at the cleaning and which in its upper part is arranged with guide plates, which are welded either longitudinally or transversally depending to capacity, whereas raw water (3') containing oil (3") and lighter particles, which parts (3' and 3") can be obtained at the coarse separation of the impurities, is introduced in the inlet (1) of the oil separation device (I), in which oil (3") and lighter particles by means of the addition of air to the there airing means (4 and 5) are lifted up onto the raw water (3') as a floating mass and are there kept and flushed into an oil outlet in the form of a pipe means (7) and are conducted from there to a collecting means in the form of a barrel, while cleansed water (8) is led out through the outlet (2) for further removal whereas the inlet (1) and the outlet (2) are arranged with level regulator or level indicator for the steering of oil and water by guide plates.

5 Claims, 2 Drawing Sheets

DEVICE FOR THE SEPARATION OF OIL FROM WATER

BACKGROUND OF THE INVENTION

1. Field of the Invention

This invention relates to a device for the separation of oil from water containing impurities in industries, waste plants, ships or the like places.

2. Brief Description of the Background of the Invention Including Prior Art

In the technique in question there are before known a number more or less technically complicated and expensive methods and devices as the U.S. Pat. Nos. 3,623,608, 4,564,457 and 5,158,678.

In wash racks for oars or industry with mechanical equipment and ships and other places as e.g. at petrol stations or communal waste plants wash water is mixed with oil, gravel or the like. Said water is then forwarded to waste water filtration plants where it has a negative effect upon the cleaning device which in many cases knocks out the function.

SUMMARY OF THE INVENTION

1. Purpose of the Invention

The purpose of this invention is to avoid the use or e.g. the before known expensive filter equipments and additions of chemicals.

These and other objects and advantages of the present invention will become evident from the description which follows.

2. Brief Description of the Invention

An apparatus for separating oil from water containing impurities in industries, waste plants, and ships, comprises an oil separation tank having a narrowing section tapered to converge in upward direction. An inlet for raw water is furnished at the oil separation tank. An outlet for purified water is furnished at the oil separation tank. An aerating means having an air outlet and an air inlet is disposed in a lower third part of the oil separation tank. An outlet is provided for draining water from the oil separation tank during cleaning of the oil separation tank. A plurality of steering plates is disposed in an upper part of the oil separation tank. An oil outlet formed as a pipe is disposed at a level higher than the outlet for purified water and about at the level of the steering plates. A first level controller for monitoring and/or controlling a level of the oil and/or the water is disposed at the inlet for raw water. A second level controller for monitoring and/or controlling a level of the water and of the oil is disposed at the outlet for purified water of the oil separation tank. Raw water containing oil and particles lighter than water, obtained at a preliminary separation of impurities, is introduced through the inlet for raw water into the oil separation tank. The oil and the particles lighter than water float atop the raw water based on an addition of air through the aerating means and form a floating mass, thereby resulting in separate layers of cleansed water and floating mass. Said floating mass flows through the oil outlet into a collecting means, while the purified water is discharged through the outlet for purified water of the oil separation tank.

The aerating means can be formed by perforated pipes, by cloth, or by a membrane.

The steering plates can be welded together longitudinally or transversely.

The collecting means can be formed as a barrel to receive oil discharged from the oil outlet.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

Figure 1:
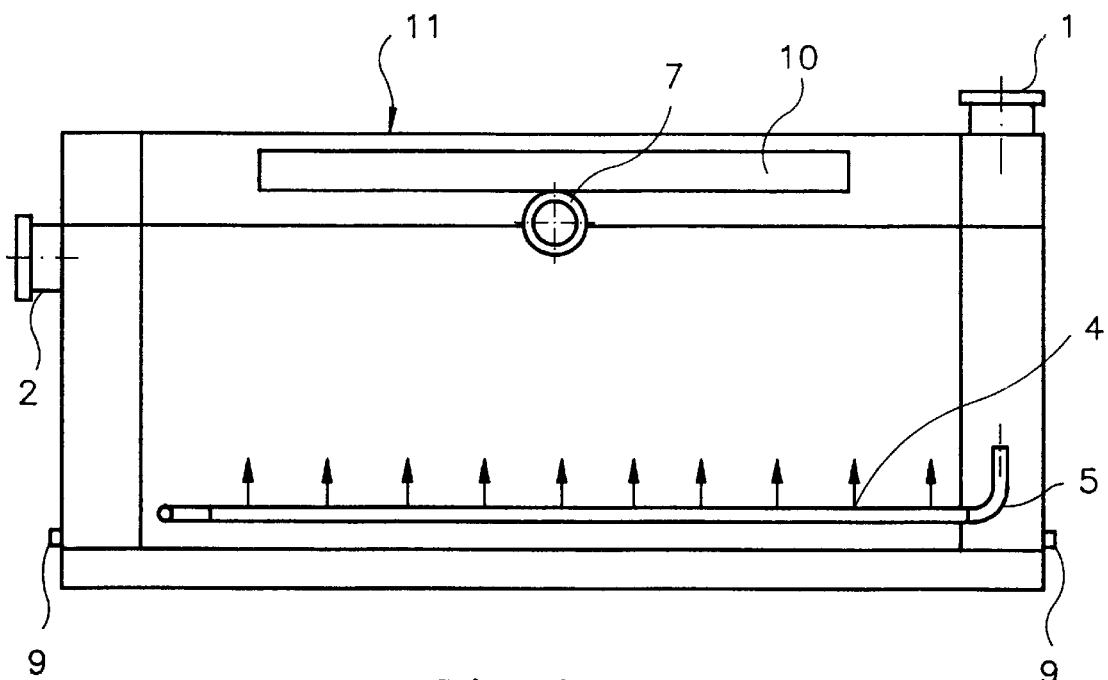
FIG. 1 is a side view of an apparatus for separating oil from water.
Figure 2:
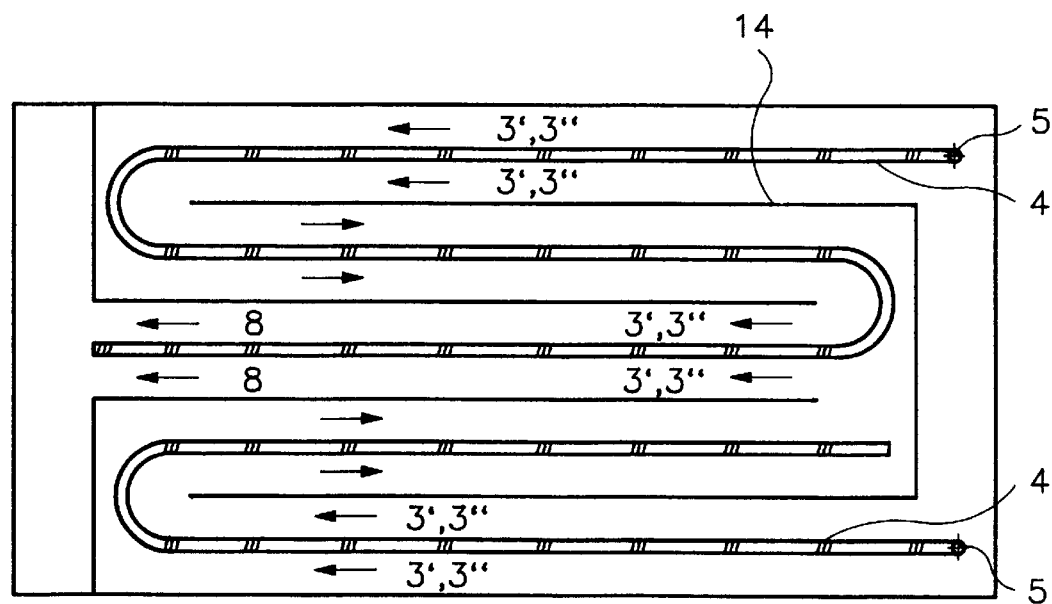
FIG. 2 is a bottom view of an apparatus for separating oil from water.
Figure 3:
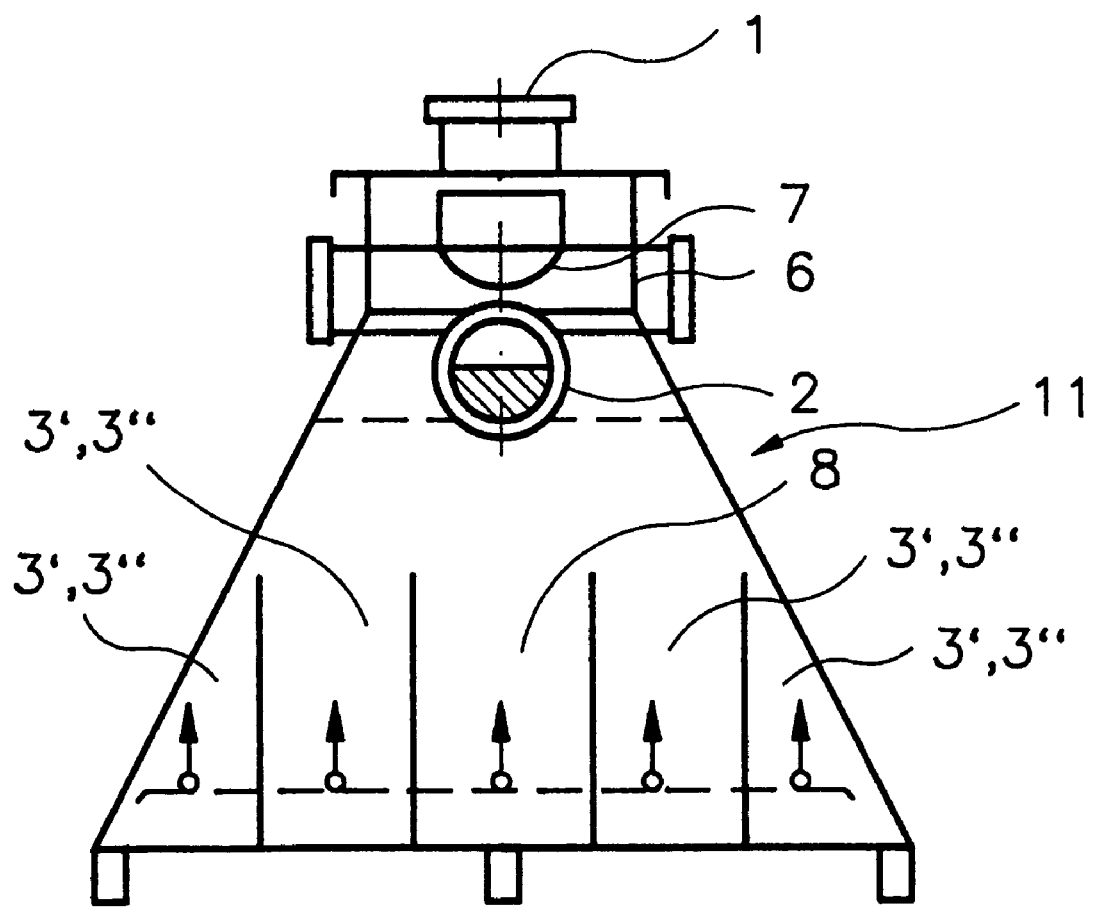
FIG. 3 is a cross-sectional view through the apparatus shown in FIG. 1.

The device according to the invention consists of an oil separation device I which is tapering upwards and provided with an inlet 1 and an outlet 2, where the inlet 1 and the outlet 2 are arranged with level regulator means or level indicator means for the steering of oil and water by means of a register means. The oil separation device 11 is suitably arranged tapering upwards, as the oil layer then becomes deeper and thus closer, which means that a large number of the particles accompanies in the oil and the attained cleaning effect removes the contents of water to 2–6%. Polluted water containing sand, gravel, oil or the like is treated in a suitable way e.g. in a coarse separation device not shown so that raw water 3' containing oil 3" and lighter particles can be introduced through the inlet 1 of the oil separation device 11. The oil separation device 11 is in its lower part provided with airing means partly in the form of perforated pipes, cloth or membrane as air outlet 4 having tight-fitting holes for forming rug partly an air inlet 5 for the treatment of raw water 3' containing oil 3" and lighter particles. Separation plates or guide plates 14 are disposed in the bottom of the oil separation device 11 for holding the aerating means 4, 5. The oil separation device 11 is also provided with steering plates 6 which can be welded either longitudinally or transversally depending on requisite capacity. At the addition of air into airing means 4 and 5 oil 3" and lighter particles are lifted up onto the raw waters 3' as a floating mass owing to lower density than the raw water 3' and are kept and flushed into an oil outlet in the form of a pipe means 7 and are conducted from there to a collecting means not shown in the form of e.g. a barrel, while cleansed water 8 is led out through the outlet 2 for further removal. The length of travel of waters 3' and 8 used is extended by means of the guide plates 14 and is subjected for air treatment the whole way from the inlet 1 to the outlet 2, which gives a more effective separation and higher capacity. The oil 3" can be emptied via the pipe means 7 independently of side. A plate 10 is disposed above the oil outlet 7 in the upper part of the oil separation device 11. For the cleaning of the oil separation device 11 this is in its lower part provided with an outlet 9 for the drawing of water. All drawing of water is steered by means of level regulator means and level indicator means and closeable or adjustable air-regulator means or a register means. Through the shaping of the oil separation device 11 the diameter is reduced and the oil layer increases in thickness. The air in adjustable and regulating amount keeps the oil on place whereas the separated water 8 in a short time becomes completely crystal-clear. Since raw water has high contents with detergents which mix with oil, the floating effect can be affected and mix with escaping water. When that is so, one further step can be performed for this treatment and measure through the connection of an oil separator or a water separator.

It will be understood that each of the elements described above, or two or more together, may also find a useful application in other types of separation devices differing from the types described above.

While the invention has been illustrated and described as embodied in the context of an apparatus for separating oil from water containing impurities, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for separating raw water containing oil and lighter particles into oil with lighter particles and purified water, comprising an oil separation tank having first and second ends and a narrowing section tapered to converge in upward direction;

an inlet for said raw water furnished at said first end at the oil separation tank;

an outlet for purified water furnished at said second end at the oil separation tank;

aerating means having an air outlet and an air inlet and disposed in a lower part of the oil separation tank;

an outlet for draining water from the oil separation tank during cleaning of the oil separation tank;

steering plates disposed in an upper part of the oil separation tank;

an oil outlet formed as a pipe disposed at a level higher than the outlet for purified water and about at the level of the steering plates;

a plurality of substantially vertical guide plates disposed in the bottom of the oil separation tank, the guide plates extending upwardly from the bottom of the tank to a level below the height of the tank and defining a tortuous channel which has a beginning that communicates with said raw water inlet and which extends from said beginning at the first end of the tank to near said second end of the tank, then back again from near said second end of the tank to near said first end of the tank and back again from near said first end in the tank to the second end of the tank where the channel terminates in flow communication with the purified water outlet, said aerating means being located within said tortuous channel;

wherein raw water containing oil and particles lighter than water, obtained at a preliminary separation of impurities, is introduced through the inlet for raw water into the oil separation tank, wherein the oil and the particles lighter than water float atop the raw water based on an addition of air through the aerating means and form a floating mass, thereby resulting in separate layers of cleansed water and floating mass, and wherein said floating mass flows through the oil outlet into a collecting means, while the purified water is discharged through the outlet for purified water of the oil separation tank.

2. The apparatus according to claim 1, wherein the aerating means is formed by perforated pipes.

3. The apparatus according to claim 1, wherein the aerating means is formed by cloth.

4. The apparatus according to claim 1, wherein the aerating means is formed by a membrane.

5. The apparatus according to claim 1, wherein the collecting means is formed as a barrel to receive oil discharged from the oil outlet.

\* \* \* \* \*